March 30, 1948.  A. R. STONE  2,438,686
MULTIPLE MOTOR
Filed June 22, 1945  3 Sheets-Sheet 3

Inventor
ALBERT RIVINGTON STONE
By John Howard Joynt
HIS Attorney

Patented Mar. 30, 1948

2,438,686

UNITED STATES PATENT OFFICE 2,438,686

MULTIPLE MOTOR

Albert Rivington Stone, Baltimore, Md.

Application June 22, 1945, Serial No. 600,947

2 Claims. (Cl. 74—189.5)

1

My invention relates to hydraulic power units and as well, to a novel assembly and control means therefor, for braking a hydraulic or other type motor unit.

A manually-actuated type of control unit for regulating an assembly of the general type described is disclosed in my companion application, Serial No. 594,279, filed May 17, 1945, and entitled Hydraulic system. This unit can be effectively included in my new assembly with entirely satisfactory results, the resulting assembly being either manually or automatically controlled as the case may be.

One object of my invention is to provide a variable speed motor having associated therewith means for holding it against motion in simple, positive, and efficient manner, together with means operable as desired for quickly and sensitively releasing said holding means, both the holding and releasing means comprising simple, sturdy and durable elements, inexpensive in themselves and involving a minimum number of moving parts, and which, displaying high reliability and sensitivity in operation, require but a minimum of trained supervision.

Another object is to provide a power unit including a motor of the type described in which I combine paired fluid motors for energizing a common power take-off shaft, the first said motor normally being effectively restrained from contributing to the drive of said take-off shaft, and its effect being compounded, when desired, on the drive shaft in simple, direct and efficient manner, and with but minimum requirement of intermediate mechanisms and these of simple, sturdy and comparatively inexpensive construction, the power unit itself displaying the advantageous qualities of ruggedness, long life, and low wear.

Still another object is to provide a power assembly embodying a power unit of the general type described in which the latter is energized, in simple, reliable and dependable manner, and with maximum efficiency and a minimum of first investment, from a common source of fixed output, unidirectional fluid energy, the assembly embodying an intermediate control unit which effectively and sensitively, under either manual or automatic control, determines the exact part of the constant output of the energy source which courses to a particular motor, and as well, the direction in which that motor is energized. This assembly is characterized by its simplicity, compactness and unitary, self-contained construction, its small number of moving parts, and

2 its consequent low cost both of construction and in subsequent operation and maintenance.

Other objects will in part be obvious and in part pointed out hereinafter during the course of the following description.

My invention accordingly resides in the several parts, elements, and features of construction, as well as in the mode of carrying them into execution, in the several operational steps, and in the combination of each of the same with one or more of the others, the scope of the application of all of which is more fully set forth in the claims at the end of this specification.

Referring now more particularly to the drawings, wherein I illustrate one embodiment of my invention which I prefer at present, Figure 1 comprises a schematic view of the complete assembly;

Figure 3 is a transverse vertical section taken on the line 3—3 of Figure 2 and looking in the direction of the arrows; while, Figure 4 is an end view taken at the left end of the unit of Figure 2.

Figure 1:
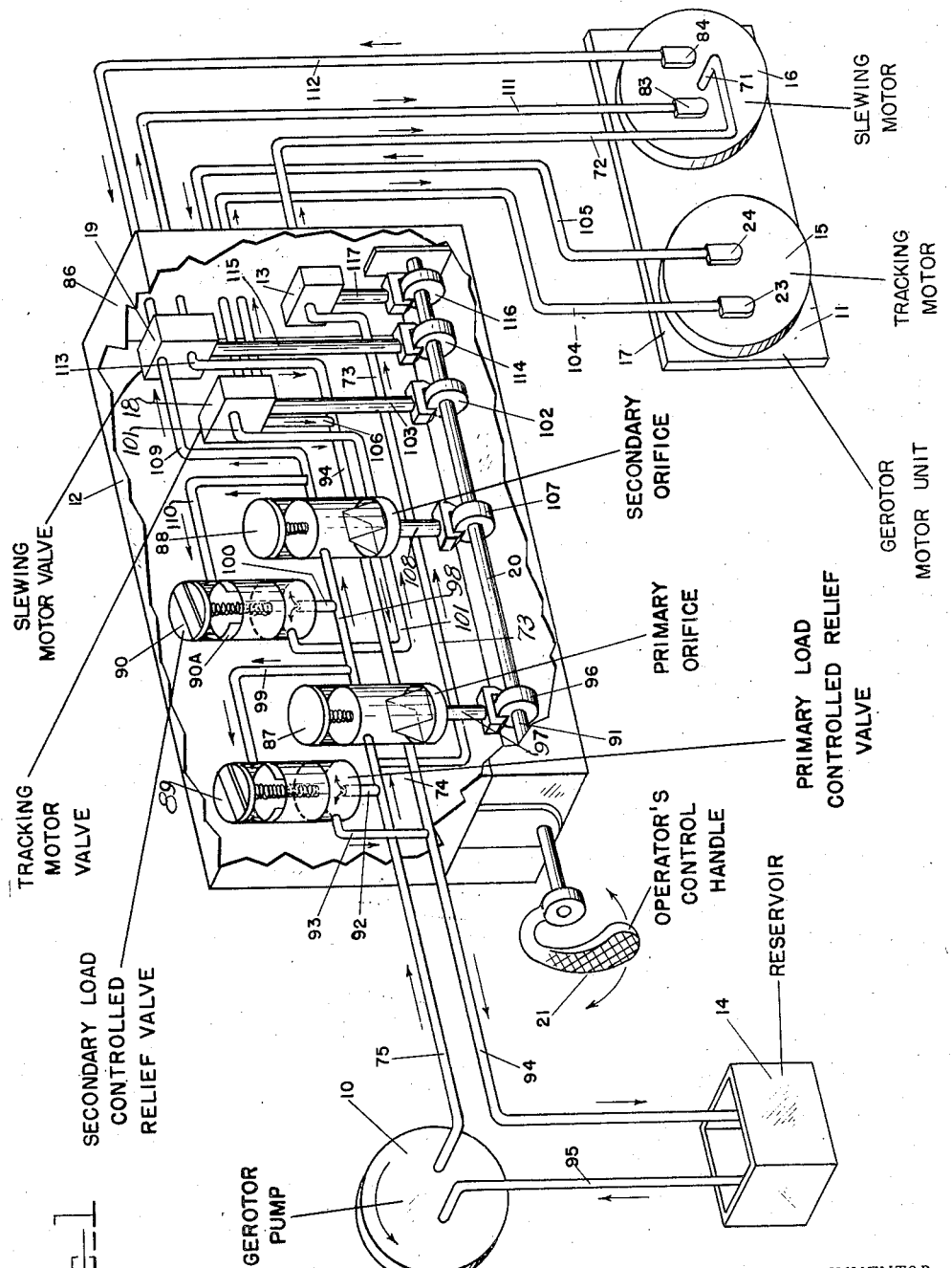

As conducive to a more thorough understanding of my invention, it is advantageous at this point to consider briefly the development of fluid powering systems, so far as they affect the evolution of my new power assembly.

The high degree of flexibility of hydraulic powering means effectively ensured the widespread acceptance of such units even when they were first introduced into the industrial arts. Particularly when multi-chambered rotary pumps and motors were evolved, permitting smooth, continuous power impulse to loads having both high torque and speed demands, widescale acceptance was quickly achieved. The flexible characteristics of hydraulic equipment resulted in many economies which had not been possible with powering equipment theretofore available. To illustrate, it became entirely practicable to adapt a single machine for a number of different services, each of somewhat diverse load requirements and characteristics, such as varying rotational speed, varying torque demands, etc. Thus, a single piece of equipment could be advantageously and effectively adapted in rapid, simple, and economical manner for servicing loads of widely divergent type, provided only that each such load was substantially constant and of substantially unvarying demand.

When, however, it became necessary to service loads of rapidly fluctuating and varying demand, both as to torque and speed requirements, substantial difficulties were still encountered, despite the increased flexibility inherent in hydraulic powering equipment. To employ several power units of like or dissimilar ratings, any one or more of which were brought onto the line as required to handle the load at maximum unit efficiencies during quiet or sub-normal conditions, other units being brought into operation when normal or peak load conditions maintained, would dissipate in substantial measure the advantages attendant upon the use of hydraulic equipment despite the highly flexible characteristics of the latter. Substantial first cost was necessarily involved, with attendant increase in overhead and depreciation charges. The advantages of flexibility within the power unit were surrendered. Moreover, greater plant space requirements were involved, and either skilled supervision was necessary, or expensive automatic auxiliaries were involved. Either recourse represented a still further increase in both space requirements and plant investment.

A further expedient, similarly impracticable, was to employ a single unit of substantial power rating which could operate either at under-load for normal or off-peak intervals and at full maximum output for peak load conditions, or else could be designed for operation at rated normal output for quiet, subnormal or off-peak periods and under overload conditions for peak load demands. In the first instance the advantages of fluid equipment would be materially sacrificed in that the normal off-load operation would be at materially reduced efficiency, thus surrendering the advantage of high system efficiency which comprises another and highly important feature of advantage of hydraulic equipment. Only at peak load conditions, ordinarily involving but a small portion of the daily operation would high efficiencies be approximated. On the other hand, with the second embodiment wherein high efficiencies are observed during normal operation, the danger is always present that upon peak load condition, endurance of such conditions either at extremely high demand for short periods of time, or continued peak demand over an unexpectedly extended period of time, might result in serious damage or even destruction of the power unit. In many types of fluid equipment, this would be manifested in fluid leakage losses of such serious effect that the system would stall. Non-stall characteristics would no longer be observed.

An important object of my invention, therefore, is to remove and eliminate in substantial measure the several disadvantages and defects of the systems heretofore available, all as has been more fully set forth hereinbefore, and at the same time to achieve a new power unit involving multiple motors, in which one or more of the motors is effectively restrained against motion at all times, when it stands de-energized, and to release the same quickly, reliably, and efficiently when fluid energy is applied thereto to bring the motor into operation. It is my further object to accomplish all this in simple, direct and efficient manner with a minimum complexity of auxiliary equipment, at low first cost and low requirements of maintenance and supervision. A still further object is to provide a motor unit of the general type described, incorporating braking means of the general type just referred to.

Now having attention more particularly to the embodiment disclosed in the several views of the drawings, discussion will first be had of the system as a whole, then of the motor and power take-off assembly, including the brake for what is known as the slewing motor, which will later be described, and then of the control unit itself. In this manner, a more comprehensive understanding may be had of the precise constructional details.

Basically (having reference to Figure 1), the system comprises a constant speed, constant output, and unidirectional source of hydraulic power 10, paired hydraulic motors indicated generally at 11, a control unit indicated generally at 12, a brake control unit indicated generally at 13, and a fluid reservoir 14, all included in what may be termed a closed hydraulic circuit.

More specifically, the pump 10 generates always at maximum efficiency, delivering, regardless of the variation of load on the paired motor unit 11, or whether one or both of said motors is energized at any particular time, a constant output of constant speed and which is delivered in but a single direction. I prefer to use a non-pulsating type of fluid pump, which necessarily substantially restricts the selection to the rotary type of pump. Inasmuch as operation is desired against all ranges of pressure heads including those of substantial value, I prefer to employ a rotary pump of the multi-chambered type, wherein the separate pumping efforts of the individual chambers are cascaded, one on the other, so that the sum total of the pumping effort is of substantial magnitude. An embodiment of this type of pump is disclosed in the copending Bartholomew F. Quintilian application, Serial No. 535,083, filed May 11, 1944, and entitled Hydraulic pump and motor. It is entirely possible, however, to incorporate successfully in my new assembly any suitable, conventional and available type of rotary hydraulic pump capable of operating against substantial pressure heads.

The paired motor assembly 11 may consist of like fluid motors having similar characteristics, or may, as in the present instance, comprise paired fluid motors of unlike characteristics. The significant point in this connection is that the motor assembly may be substantially tailored to adapt it best for the general range of hydraulic problems for which it is designed. In the instance here undergoing description, just as is true of the specific embodiments described in my said two copending applications, these motors 15 and 16 are intended for operating a turret control of any general type. Particularly, however, it is designed for effective operation of the gun turret of land tanks and similar vehicles. In such instances, as has been more particularly described in the said copending applications, it is desired to train the turret quickly into the general region of the target, and in so doing, to overcome rapidly the inertia incident upon starting the turret from its condition of rest. The tracking motor 15 is of such design as to accomplish rapid starting in effective manner. The motor couples high torque characteristics with low speed of operation. It quickly brings the turret from its position of rest into one of motion. After starting inertia has been effectively overcome and the turret has been brought into motion the effect of motor 16 is compounded on that of motor 15.

Motor 16 is designed and geared for low-torque, high-speed duty. This quickly swings the turret through its travel and brings the gun approximately on its target. At this point it is important to take the motor 16 quickly out of operation and, under the control of motor 15, overcome the inertia of motion of the tank turret, and to complete in quick and accurate manner the training of the gun on its target without any "hunting" of the motors.

These motors 15 and 16, inasmuch as they operate against substantially heavy-duty load conditions, are both preferably of the high-pressure type. For effective utilization of the non-pulsating energizing fluid from pump 10, fluid motors 15, 16 are preferably of the rotary type. Moreover, high-pressure duty dictates that they be of the multi-chambered variety. It is entirely possible, however, to use any suitable type of variable direction, multi-chambered rotary fluid motors. Like satisfactory results can be achieved by such use.

The motors 15 and 16 are schematically illustrated in Figure 1 as mounted on a common body 17. This is simply a schematic representation of a self-contained unitary mounting on a suitable foundation, sufficiently rugged to withstand all vibrational disturbance and torque reaction.

As has been stated, pump 10 and motor unit 11 are connected through what may be termed a closed hydraulic circuit which includes the reservoir 14 and control unit 12, the braking control 13 constituting an auxiliary branched from the main hydraulic circuit, in the nature of a bleeder line. Reservoir 14 effectively serves to ensure that at all times sufficient fluid is available in the system to compensate for leakage losses, etc.

It has been stated that pump 10 is of constant, uni-directional output, while motors 15, 16 can be energized in desired manner from the pump 10. This is accomplished through control unit 12. Very briefly, the function of the control 12, is either under manual or automatic regulation, here shown as manual, to handle the full output of pump 10 and to direct it through the proper channels and in proper proportions, either first, directly back as by short-circuit to reservoir 14; second, to motor 15; third, to motor 16; fourth, to motors 15 and 16, in any desired combination, in any desired proportions, and in desired directions so far as concerns motors 15 and 16.

To accomplish the energization of motor 15 or 16, or both, in desired directions four-way valves 18 and 19 are included in the control unit 12. Auxiliary control 13 is physically included in the control unit 12, and is operated from the control shaft 20, which is common to the two control elements and is shown as operable manually through a conventionally-illustrated handle 21. Before directing further attention to control unit 12, however, attention will now be directed to the power unit or motor assembly shown in Figures 2 through 4, inclusive.

Figure 2:
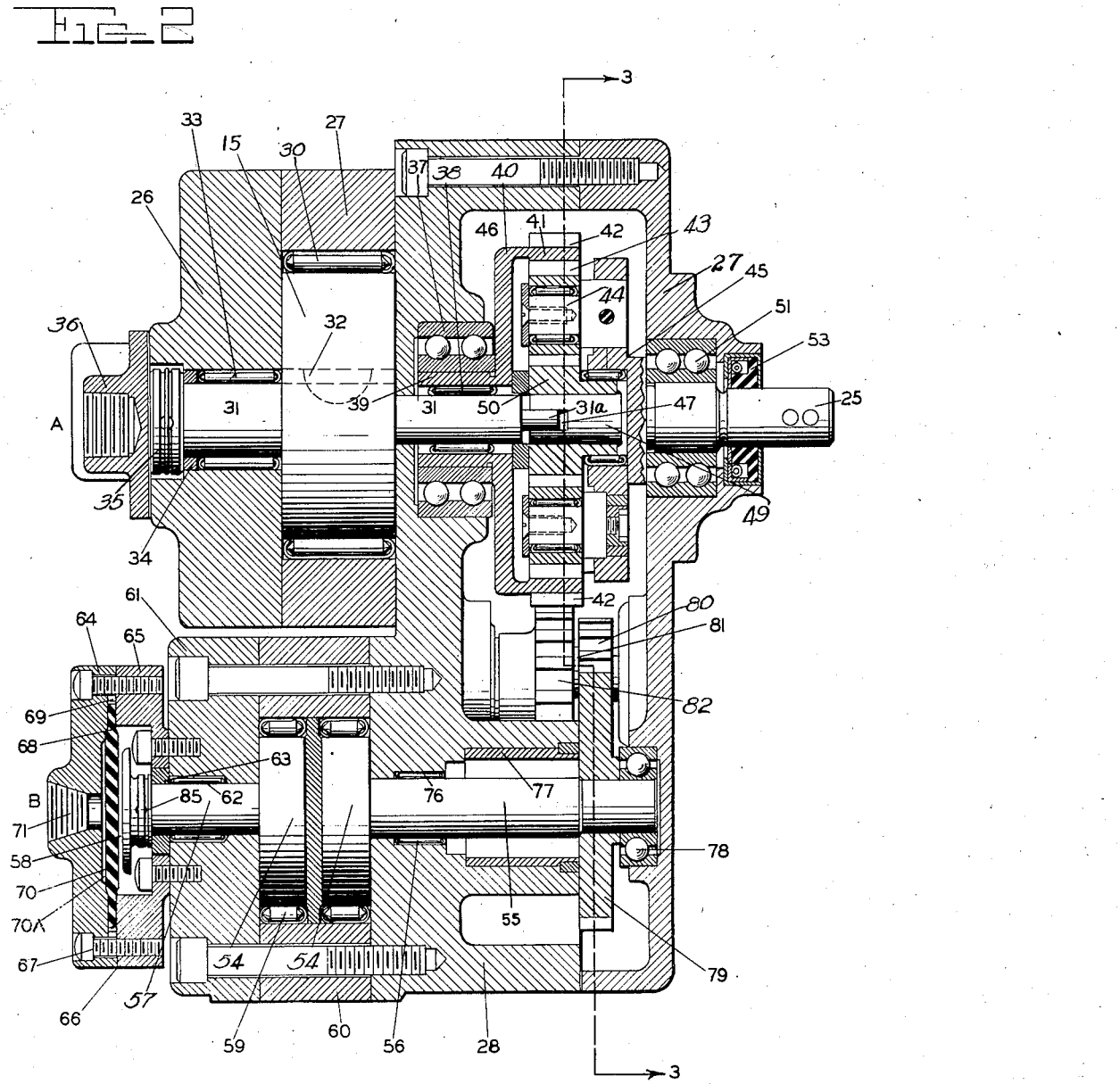
Figure 2 is a vertical longitudinal section through a power unit embodying my new braking means taken on the line 2—2 of Figure 4, and looking in the direction of the arrows.
Figures 3, 4:
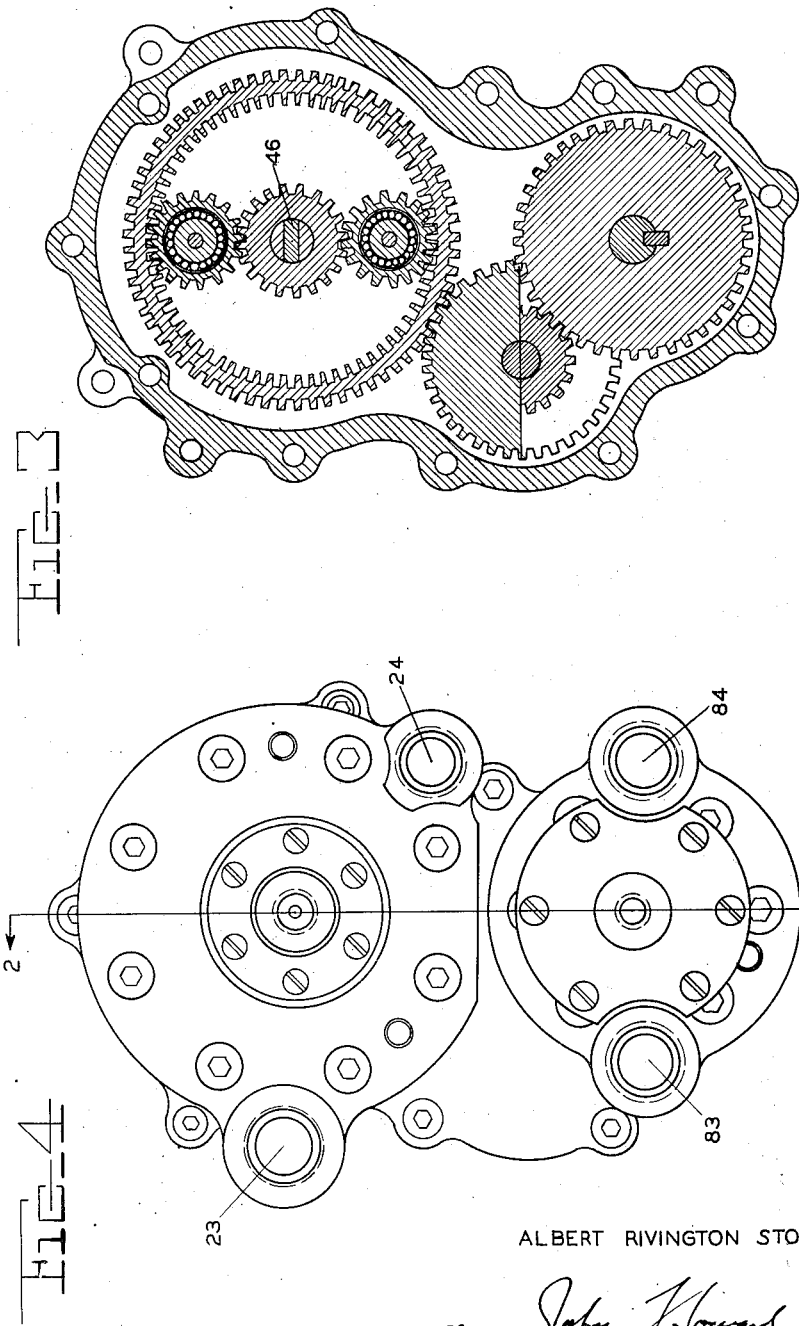

The tracking motor, of high torque, low-speed characteristics, is indicated generally at 15 in Figure 2, having ports 23, 24 (Figures 1 and 4), which are interchangeably available as inlet and outlet ports, respectively, depending upon the direction in which motor 22 is energized. The desired torque and speed characteristics are achieved through the gearing by which motor 22 (corresponding to motor 15 of Figure 1) powers take-off shaft 25 (Figure 2). For convenience of assembly, the motor 22 is contained in a multiple housing, comprising, generally end plate 26, intermediate motor block 27, a larger unit block 28 and a further end plate 29. Motor 22 is carried in block 27 in suitable anti-friction manner as by needle bearings 30. It is made fast to shaft 31 in suitable manner as by key 32.

It will be noticed that the stub shaft part of shaft 31 which protrudes to the left of tracking motor 22 is of larger diameter and of shorter length than that portion thereof protruding to the right of motor 22. This left part of shaft 31 serves as a counterpoise for the working end of the shaft, which protrudes to the right. Suitable anti-friction bearings, such as needle bearings 33, serve to carry this stub shaft 31 in end member 26. Sealing gasket 34, drainage means 35, and end cap 36 serve to close the left terminal of the bore through end member 26.

Within block 28 is carried suitable bearing members such as ball bearings 37 in concentric relation with the needle bearings 38 which directly carry shaft 31. Between the concentric bearings 37, 38 is provided the annular hub 39, comprising a sleeve like member, of ring gear spider 40. This spider 40 terminates in an axially-offset ring gear 41 having outer teeth 42 and inner teeth 43. The inner teeth 43 mesh with the corresponding teeth of planet gears 44, a number of which are rotatably carried in power take-off spider 45. Spider 45 is disposed at the right of ring gear 41 and planet gears 44, in a suitable annular space 46 provided by complemental openings in block 28 and end member 29.

The extreme right end of shaft 31 terminates in a tongue 36a of generally rectangular section, snugly received in a recess 47 of complemental shape provided in a hub 49 of sun gear 50. End plate 29 carries a ball bearing 51 for receiving in anti-friction manner the power take-off shaft 25 which is fast to power-take-off spider 45 and which serves to transmit the power from the tracking and slewing motors to a common load. Sealing gasket 53 serves effectively to prevent leakage to the exterior past end plate 29. Effective use is made of a number of suitable anti-friction bearings, for securely protecting the several parts of the drive mechanism from frictional wear against each other, resulting from either rolling contact or end play.

Depending upon the manner in which the four-way valve mechanism heretofore referred to directs the energizing fluid to tracking motor 15, this motor rotates shaft 31 in such manner as to carry with it the sun gear 50 in desired direction. Spider 40 for ring gear 41 idles on shaft 31, moving freely relative thereto. Sun gear 50 meshes constantly with and rotates planet gears 44. These latter mesh with the inner teeth 43 of ring gear 41. Reacting against this ring gear when the latter is locked, they exert driving impetus on power take-off spider 45. In turn this applies rotational effort to power take-off shaft 25. The manner in which the locking is accomplished will now be described in conjunction with the following description of the slewing motor.

The slewing motor 16 is indicated generally at the bottom left of Figure 2. Shaft 55 is powered by this motor, extending therethrough and including a stub shaft portion 57 at the left side thereof. At its outer end, this stub shaft portion 57 terminates in an enlarged braking head 58.

Motor 16 is carried by anti-friction bearings 59, provided in an intermediate casing 60, made fast to block 28. A further intermediate casing member 61 separate from but fast to casing 60, serves to house shaft 57 in anti-friction bearings 62. A sealing gasket 63 prevents leakage between casing 61 and the complemental portions 64, 65 of an end cap indicated generally by the reference character 66.

The parts 64, 65 of end cap 66 are made separately and are adapted to be attached together in any desired manner as by bolts 67 so as to receive a brake diaphragm 68 provided between elements 64, 65 and adapted to be positioned in operable manner as by threading bolt 67 through suitable eyes 69 provided in diaphragm 68. This diaphragm is received in an opening 70 which is provided by recesses in elements 65, 64. Normally it bears tightly against the enlarged head 58 of shaft 57.

Through threaded orifice 71 in element 64, pressure fluid can be conducted from the exterior to the left side 70A of the space 70, provided by elements 64, 65. A fluid line 72 interconnects orifice 71 with brake-release control 13 (Figure 1), while a further fluid line 73 connects this releast means 13 through T-connection 74 with the conduit means 75 leading from the outlet side of pump 10. Thus, the full outlet pressure of pump 10 is exerted on diaphragm 68 to force it in braking engagement against bearing plate 58.

Shaft 55 extends through anti-friction bearing 76 in block 28 outwardly to the right, and is carried in turn, at its outer end, by roller or ball bearings 78, which effectively serve as thrust bearings. Spur gear 79 carried on shaft 55 meshes with pinion 80 which is also fast to the shaft 81 as is spur gear 82. This shaft is carried by block 28. Spur gear 82 meshes with the outer teeth 42 on ring gear 41.

Energizing fluid is admitted to the slewing motor 16 through suitable ports 83, 84 (Figure 4) either of which may serve as inlet or outlet port, depending upon the direction in which the energizing fluid is directed by control unit 12 to the motor. Motor 16 may be of the multi-chambered rotary type, reversible in direction. As I have stated, preferably but not necessarily I use a motor available on the market.

In operation, just as has been stated, the tracking motor starts the shaft 25 into rotation under high-torque, slow-speed conditions, in which case it is important that the ring gear 41 be held firmly against rotation. As soon as starting inertia is overcome, it frequently is desirable to compound on the slow-speed characteristics of tracking motor 15 and associated gear train the high-speed characteristics of slewing motor 16 and its associated gear train to bring the gun turret or other suitable load serviced by shaft 25 as quickly as possible into its approximate operable position. Then, when it is desired to bring the load smoothly and accurately to a predetermined stopping position, overcoming the inertia of motion, recourse is again had to the tracking motor alone. Thus, it becomes necessary first to brake motor 16 positively against motion, then quickly to release the same fully from the inhibitive action of such braking; and later, to brake motor 16 quickly to a positive stop, so that the ring gear 41 will again be locked. Brake diaphragm 68 admirably fulfills these several functions, and gives quick, positive, reliable and efficient control at all times.

When the motor 16 stands de-energized, a static head of energizing fluid is established at orifice 71 on the left side of diaphragm 68 under substantially full line pressure from the output side of pump 10 (Figure 1). The comparatively large area of this diaphragm insures that the latter is forced sharply to the right, in Figure 2, into braking position. Similarly, the substantial contact area afforded by the enlarged head 58 of stub shaft 57 insures that positive braking action is available.

It is a characteristic of hydraulic equipment that when operating under load conditions, appreciable fluid leakage occurs between the moving parts. This leakage characteristic is availed of in the present instance to insure quick and positive unseating of the diaphragm 68 from the shaft head 58 when pressure is removed from the left side of diaphragm 68 by the brake release means 13. As soon as the motor 16 is brought into operation, reverse leakage pressure is exerted, which quickly exerts sufficient pressure against the right side of diaphragm 68 to force it away and to release it from the head 58 of shaft 57. The absence of static pressure head on the left side of this diaphragm 68, occasioned by cut-off under control valve 13, facilitates such action. The motor 16 is then free to rotate without hindrance by the brake 68.

As soon as motor 16 is de-energized, however, the leakage pressure head within the motor is released by drainage occurring through opening 85 in shaft 57, while simultaneously static pressure head is again exerted at orifice 71. The large-area diaphragm 68 is again engaged firmly against enlarged head 58, the resulting frictional resistance quickly and effectively bringing the motor 16 and its associated gear train to an absolute stall, restraining the ring gear 41 against rotation. In this manner, accurate and sensitive drive control is achieved for the power take-off shaft 25. The gun turret or other suitable load can be quickly and effectively positioned without overrunning of the turret or hunting of the motor unit 11 (Figure 1).

Discussion has already been had of the system in general and of the powering unit itself. There remains for description, the control unit 12 and the manner in which it exerts effective control over motors 15, 16.

Upon reference again to Figure 1, unit 12 is seen to comprise generally a casing 86 in which are housed a primary orifice 87, a secondary orifice 88, a primary load-controlled relief valve 89, and a secondary load-controlled relief valve 90.

Cam shaft 20 serves to actuate the primary orifice members in a manner which will now be described. This cam shaft 20 is powered either by a manual handle 21, as shown, or through suitable automatic means.

It will be recalled that a constant direction, constant output is delivered at all times from pump 10. This is delivered through high pressure conduit 75. We will assume first that cam shaft 20 is in its zero or rest position, so that primary orifice 87 is not opened to any extent at all. Through nipple 92 the entire output of pump 10 then passes through the bottom part of primary relief valve 89 to exhaust conduit 93 and thence through return line 94 to reservoir 14, whence the exhaust fluid is returned through conduit 95 to pump 10. We will assume, secondly, that handle 21 is thrown a slight distance either way, out of its zero or rest position. Cam 96 on shaft 20 thereupon lifts cam follower rod 97 so as to displace the primary orifice member 87 upwardly, permitting the flow of a metered quantity of fluid from conduit 75 through this orifice, along conduit 93, to the right of orifice member 87.

A static pressure head is thereupon established in riser 99 which is tied in with conduit 98, thereby conducting fluid to the top side of primary relief valve 89 and seating the same at least partly over the corresponding opening to exhaust conduit 93. This either eliminates or reduces the quantity of fluid output of pump 10 which is shunted directly back to the reservoir 14. A substantial part of the fluid courses conduit 98. Blocked at secondary orifice member 88, which has not yet been affected by the movement of cam shaft 20, this fluid courses upwardly through riser 100 to the bottom side of secondary release valve 90. Thence the energizing fluid courses conduit 101 to four-way valve 18 which controls the tracking motor. Through cam 102 and associated cam follower 103, the direction of rotation of cam shaft 20 has determined the direction of opening of four-way valve 18. We will assume that the direction of energization is as indicated by arrows in Figure 1, so that line 104 serves to conduct the energizing fluid from four-way valve 18 to port 23, now the admission port, of tracking motor 15. From port 24, now the outlet port, the spent fluid returns through conduit 105 to valve 18, and thence through riser 106 to associated line 94 and thence back to reservoir 13.

Let us assume for the moment, however, that through control handle 21, cam shaft 20 is rotated an equal extent in the opposite direction from that already described. In such instance, the fluid through valve 18 courses line 105 to port 24, now the admission port of motor 15, and thence through exhaust port 23 and line 104 back to valve 18. The circuits between pump 10 and valve 18 remain as has already been traced.

We will assume that handle 21 has been swung still further in either direction, so that through cam 107 and cam follower 108, secondary orifice element 88 is opened slightly. Fluid then courses line 98, through element 88 and conduit 109 to four-way valve 19 for slewing motor 16. Through riser 110 a static pressure head is exerted from conduit 109 on the top side of secondary relief valve 90, moving the piston 90<sup>A</sup> thereof downwardly so as to block at least partly the intake port of line 101. The quantity of fluid to tracking motor 15 is thus diminished. Direct short-circuiting of the output of pump 10 is effectively precluded through the circuits already traced. The entire output of pump 10 thus is divided between the motors 15, 16. From the four-way valve 19 the energizing fluid is directed to the slewing motor 16. In the instance under discussion, rotation of handle 21 has been in such direction as to cause fluid to course conduit 111 from valve 19 to port 83, now serving as the admission port of pump 16. Returning, the spent fluid courses through port 84, now serving as the outlet port, conduit 112, back to valve 19, and thence through conduit 113 to conduit 94 and back to reservoir 14. Control of the four-way valve 19 is accomplished by means of cam 114 and follower rod 115, energized from cam shaft 20.

Reversal of direction of rotation of handle 21 to the same angular throw as has just been described results simply in reversal of connections between valve 19 and motor 16.

A cam 116 is provided on cam shaft 20 and actuates a cam follower 117 which serves the brake release means 13. A static fluid head is at all times exerted on the inlet side of this brake release means 13 by suitable means such as conduit 73 which ties in on the main outlet line 75 from pump 10. The maximum line pressure is thus always available at release element 13. The design of the release means 13 is such that this member is normally open so that substantially full line pressure from line 73 is exerted through conduit 72 to orifice 71 of slewing motor 16. This insures that the brake diaphragm 68 (Figure 2), is forced with maximum line pressure against the braking reaction element 58. The common control means 20 for the control unit 12 and brake release unit 13, however, is so timed with element 13 and four-way valve 19 that when the latter is actuated to energize slewing motor 16 in either direction, immediate blocking is occasioned at release means 13. Thereupon, by the use of conventional bleeder means not shown, the pressure against diaphragm 68 is immediately released, and the motor 16 is free to rotate. However, upon de-energization of four-way valve 19 by throw of operating control handle 21, the release means 13 is completely unblocked, so that full line pressure is applied to conduit 72 to return diaphragm 68 to braking position against reaction plate 58.

It will at once be evident from the foregoing that pump 10 operates always at maximum efficiency. Under accurate and sensitive control, it effectively applies energizing fluid to either or both of two coacting motors in such manner that these latter will service a variable and fluctuating load in the most efficient manner possible. The high-torque, low-speed motor 15, operating alone, serves always to service the load with maximum operating efficiency through its associated gear train. This is possible because the high-speed, low-torque motor 16 is at all times effectively blocked by brake 68 while it stands de-energized, so that the ring gear 41 of the tracking motor gear system, with which the gear train of the slewing motor meshes, is effectively locked against idling rotation on the system. Maximum reaction thrust is thus always provided for.

Inasmuch as the basic principles of my invention as herein disclosed are susceptible to many constructional embodiments, and since many modifications and adaptations may be made of the embodiment hereinbefore described, it is to be understood that the foregoing description is simply by way of illustration and is in no sense to be construed as limitative.

I claim:

1. A hydraulic power unit comprising, in combination, a fluid-energized rotary motor having an elongated shaft, a diaphragm disposed at one end of said shaft and normally bearing thereagainst and serving as a brake, means for supplying energizing fluid to said motor, fluid means for normally applying said diaphragm against the end of said shaft, means for releasing said brake, and a common control means for regulating said fluid supply means and said release means, and serving to actuate said brake release means as an incident to admittance of energizing fluid to said motor.

2. A hydraulic power assembly comprising, paired hydraulic motors having power output shafts, a source of fluid power supply for said motors, control valve means for metering fluid to said motors from said power supply, a diaphragm disposed at the end of one of said motor shafts and serving as a brake for the same, means for releasing said brake, a power take-off shaft common to said motors, planetary gearing connecting the output shafts of said motors in driving relation with said take-off shaft, and control means for regulating said control valve means and serving to actuate said brake release means as an incident to admittance of energizing fluid to the motor corresponding to said brake.

ALBERT RIVINGTON STONE.

REFERENCES CITED

The following references are of record in the file of this patent:

UNITED STATES PATENTS

| Number | Name | Date |
|---|---|---|
| 1,349,924 | Swanson | Aug. 17, 1920 |
| 1,711,967 | Robson | May 7, 1929 |
| 1,987,698 | Montelius | Jan. 15, 1935 |
| 2,138,208 | Rosen | Nov. 29, 1938 |
| 2,153,997 | Verderber | Apr. 11, 1939 |
| 2,211,406 | Cannon | Aug. 13, 1940 |
| 2,366,398 | Harrington | Jan. 2, 1945 |
| 2,393,918 | Linden et al. | Jan. 29, 1946 |

FOREIGN PATENTS

| Number | Country | Date |
|---|---|---|
| 9,519 | Great Britain | Apr. 19, 1911 |